US012576669B2

(12) United States Patent

Moradnia

(10) Patent No.: US 12,576,669 B2

(45) Date of Patent: Mar. 17, 2026

(54) VEHICLE WHEEL COVER

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 18/176,704

(22) Filed: Mar. 1, 2023

(65) Prior Publication Data

US 2024/0294035 A1 Sep. 5, 2024

(51) Int. Cl.
B60B 7/00 (2006.01)
B41M 5/00 (2006.01)
B60B 7/18 (2006.01)

(52) U.S. Cl.
CPC .......... B60B 7/006 (2013.01); B41M 5/0041 (2013.01); B60B 7/0046 (2013.01); B60B 7/0086 (2013.01); B60B 7/18 (2013.01); B60B 2310/616 (2013.01); B60B 2900/513 (2013.01); B60B 2900/572 (2013.01)

(58) Field of Classification Search
CPC ..... B60B 7/006; B60B 7/0046; B60B 7/0086; B60B 7/18; B41M 5/0041
See application file for complete search history.

(56) References Cited

U.S. PATENT DOCUMENTS

| 4,878,719 | A | | 11/1989 | Wreede et al. | |
| 5,058,959 | A | * | 10/1991 | Miles | G09F 3/00 |
| | | | | | 40/6 |
| 5,239,396 | A | | 8/1993 | Thompson | |
| 5,931,543 | A | | 8/1999 | Smith | |
| 8,327,564 | B2 | | 12/2012 | Ishikawa et al. | |
| 10,766,299 | B2 | | 9/2020 | Dellock et al. | |
| 2006/0238017 | A1 | * | 10/2006 | Samson | B60B 7/06 |
| | | | | | 301/37.101 |
| 2014/0204344 | A1 | | 7/2014 | Harris | |
| 2015/0185160 | A1 | * | 7/2015 | Lacoste | B41M 3/144 |
| | | | | | 215/230 |

FOREIGN PATENT DOCUMENTS

| DE | 20302081 | U1 | 7/2003 |
| DE | 102011104264 | A1 | 3/2012 |
| JP | 3023817 | U | 4/1996 |

* cited by examiner

*Primary Examiner* — James A Dudek
(74) *Attorney, Agent, or Firm* — Morgan Lincoln; American Honda Motor Co., Inc.

(57) ABSTRACT

A vehicle wheel cover is provided. The vehicle wheel cover includes a base, and a printed layer formed at a first location of the base. The printed layer is formed from a plurality of layers of images, such that, at least a first layer of the plurality of layers is located at a first depth from other layers of the plurality of layers. The vehicle wheel cover further includes a plurality of brake cooling holes that is formed as a pattern at a second location of the base. The second location is different from the first location. Based on a movement and an illumination of the vehicle wheel cover, the printed layer forms a three-dimensional graphic image.

20 Claims, 6 Drawing Sheets

500

Dispose Base 502

Form printed layer at first location of base, printed layer is formed from plurality of layers of images 504

Form plurality of brake cooling holes as pattern at second location of base, second location is different from first location 506

VEHICLE WHEEL COVER

BACKGROUND

Vehicles have wheels that includes different wheel faces to improve aesthetic appearance of the vehicle. For example, the wheel faces may be covered by wheel covers that may typically have a substantially concave structure to improve aesthetic appearance of the vehicle. In some instances, it may be observed that the substantially concave structure may improve styling of the wheels but inhibit an airflow movement around wheels of the vehicles, which may subsequently increase an aerodynamic drag of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a vehicle wheel cover is provided. The vehicle wheel cover may include a base. The vehicle wheel cover may further include a printed layer that may be formed at a first location of the base. The printed layer may be formed from a plurality of layers of images, such that, at least a first layer of the plurality of layers may be located at a first depth from other layers of the plurality of layers. The vehicle wheel cover may further include a plurality of brake cooling holes that may be formed as a pattern at a second location of the base. The second location may be different from the first location. Based on a movement and an illumination of the vehicle wheel cover, the printed layer may form a three-dimensional graphic image.

According to another embodiment of the disclosure, a vehicle wheel cover may be provided. The vehicle wheel cover may include a base. The vehicle wheel cover may further include a printed layer that may be formed at a first location of the base. The printed layer may be formed from a plurality of layers of images, such that, at least a first layer of the plurality of layers may be located at a first depth from other layers of the plurality of layers. The vehicle wheel cover may further include a plurality of brake cooling holes that may be formed as a pattern at a second location of the base. The second location may be different from the first location.

According to another embodiment of the disclosure, a method for forming a wheel cover is disclosed. The method may include disposing a base. The method may further include forming a printed layer at a first location of the base. The printed layer may be formed from a plurality of layers of images, such that, at least a first layer of the plurality of layers may be located at a first depth from other layers of the plurality of layers. The method may further include forming a plurality of brake cooling holes as a pattern at a second location of the base. The second location may be different from the first location

Figure 1A:
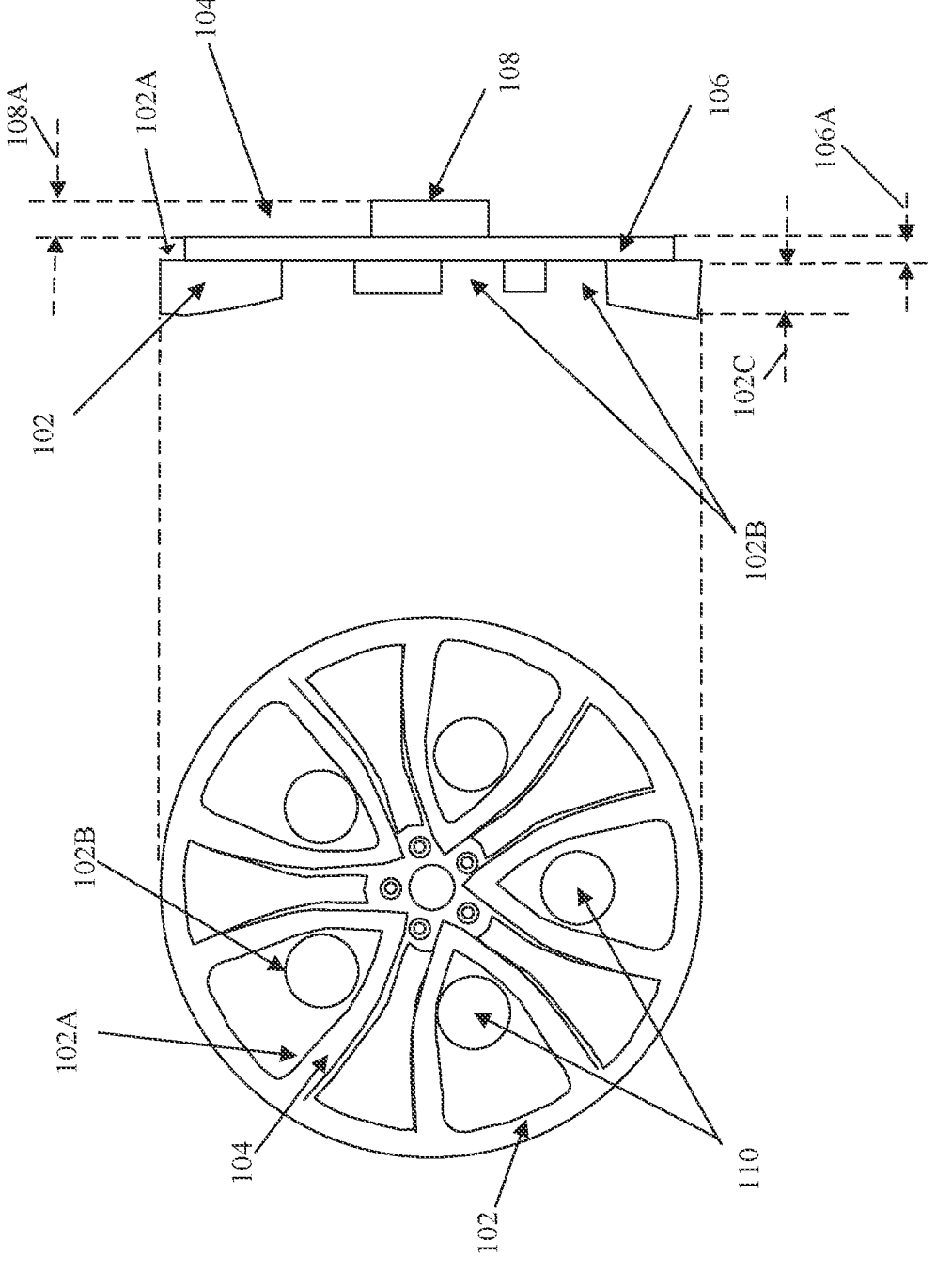
FIGS. 1A-1B are perspective views of a vehicle wheel cover coupled to an exemplary vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed vehicle wheel cover. The vehicle wheel cover may include a base and a printed layer (for example, a graphic image of a wheel) that may be formed at a first location of the base. The printed layer may be formed from a plurality of layers of images (for example, a graphic image of plurality of spokes of the wheel), such that, at least a first layer (such as a graphic image of a first spoke of the wheel) of the plurality of layers is located at a first depth from other layers of the plurality of layers. Based on a change in depth between the first layer (such as the first spoke) and other layers (such as a graphic image of other spokes of the wheel) of the plurality of layers, the vehicle wheel cover may form a three-dimensional graphic image (such as a holographic image) based on an illumination of the vehicle wheel cover.

The vehicle wheel cover may further include a plurality of brake cooling holes (such as vent holes) formed as a pattern (for example, circular pattern) at a second location of the base, which may be different from the first location. The plurality of brake cooling holes may be configured to allow airflow on brakes of the wheels and improve cooling of the brakes located in the wheels of the vehicle. Therefore, the plurality of brake cooling holes may improve a lifetime of the brakes located in the wheels of the vehicle.

The vehicle wheel cover may be further configured to include a replaceable member with different wheel styles that may be selectively replaced based on a requirement of a user of the vehicle and may further facilitate a personalized styling for the user of the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1B:
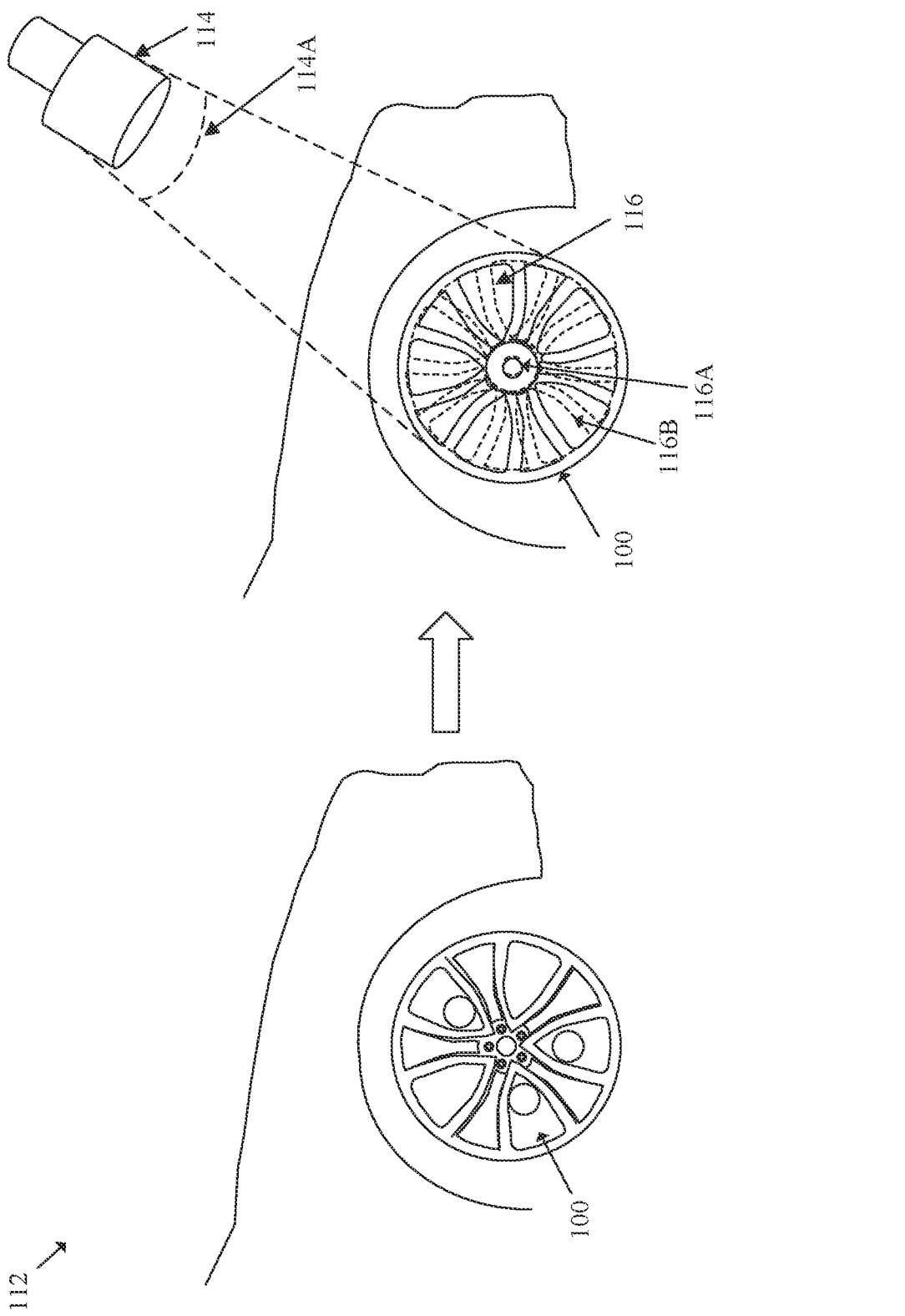

FIGS. 1A-1B are perspective views of a vehicle wheel cover coupled to an exemplary vehicle, in accordance with an embodiment of the disclosure. With reference to FIG. 1A, there is shown a vehicle wheel cover 100. The vehicle wheel cover 100 may include a base 102, and a printed layer 104 disposed on a first location 102A of the base 102. The vehicle wheel cover 100 may further include a first layer 106, a second layer 108, and a plurality of brake cooling holes 110 disposed on a second location 102B of the base 102.

The base 102 may be configured to accommodate the printed layer 104 and the plurality of brake cooling holes 110. In an embodiment, the base 102 may include the first location 102A and the second location 102B. The printed layer 104 may be formed on the first location 102A of the base 102 and the plurality of brake cooling holes 110 may be formed on the second location 102B of the base 102. In an example, the first location 102A may be located on a surface of the base 102, which may include at least one of: a substantial boundary-section of the base 102, a substantial mid-section of the base 102, a substantially sliced section of the base 102, or a substantially equidistant-sections of the base 102. In another example, the first location 102A may be a section that may be internally indented from a boundary of the base 102. In another example, the second location 102B may be located at a substantially sliced section of the base 102, or a substantially equidistant sections of the base 102.

The base 102 may be circularly shaped and may have a substantially flat structure. The base 102 may also have other shapes and structures based on user requirements of the vehicle. For example, the base 102 may have any shape, such as, one of: a substantially circular shape, a substantially polygonal shape, and the like. In another example, the base 102 may have any structure, such as, one of: a minimally arcuate structure, a flat structure, and the like.

In an embodiment, the base 102 may have a contour (such as the minimally arcuate structure) that may control an angle of incidence of an illumination of light on the printed layer 104 and control corresponding formation of the three-dimensional graphic image (as shown in FIG. 1B). For example, if the base 102 has the contour that has a substantially flat structure, the angle of incidence of the illumination of light on the printed layer 104 may change and the three-dimensional graphic image may be correspondingly formed. In another example, if the base 102 has the contour that may be formed at a first angle (say, "θ"), then the angle of incidence of the illumination of light on the printed layer 104 may be a second angle (say, "α"). Therefore, a change in angle of the base 102 may change the angle of incidence of the light on the printed layer 104. Description of the angle of incidence is further described, for example, in FIGS. 1B, and 3.

In another embodiment, the base 102 may have a first thickness 102C in a first range from 1 mm to 3 mm. For example, the base 102 may include 1 mm thickness in case of wheels of sports vehicles, where a minimal weight and reduced drag in aerodynamics of the vehicle are required. In another example, the base 102 may include 3 mm thickness in case of wheels of passenger vehicles. In certain instances, the base 102 of the vehicle wheel cover 100 may be merely used to conceal parts of the wheel and improve an aesthetic appearance of the wheels. The aesthetic appearance may be further improved by the printed layer 104.

The printed layer 104 is formed on the first location 102A of the base 102. In an embodiment, the printed layer 104 may be formed as images of spokes of the wheels. For example, each spoke is equally spaced from other spokes of the printed layer 104. In another embodiment, each spoke is spaced at a pattern from other spokes of the printed layer 104. For example, a first spoke and a second spoke of the printed layer 104 may be spaced at a first space and a third spoke and a fourth spoke of the printed layer 104 may be spaced at a second space. The first space may be different from the second space. The first space and the second space may be repeated in a sequential manner between other spokes of the printed layer 104. In yet another embodiment, each spoke is spaced at different spacings from other spokes of the printed layer 104. For example, no two spokes in the printed layer 104 have equal spacing with other two spokes of the printed layer 104.

In another embodiment, the printed layer 104 may include images other than spokes of the wheels. For example, the printed layer 104 may include a textual image, or a moving graphic image. The textual image or the moving graphic image may indicate a visual alert for users in an environment of the vehicle wheel cover 100. The textual image or the moving graphic image may also improve styling of the vehicle wheel cover 100. Details of the textual image or the moving graphic image of the printed layer 104 may be described, for example, in FIG. 3.

In an embodiment, the printed layer 104 may include at least one layer of the plurality of layers of the printed layer 104, which may be formed from a translucent material. In such instances, the printed layer 104 may allow a part of light to pass through the printed layer 104. In other instances, the printed layer 104 may prevent a part of light to pass through the printed layer 104. Instead of passing through the printed layer 104, the part of light may get scattered within each layer of the printed layer 104 and illuminate each layer of the printed layer 104. In an example, all layers of the printed layer 104 may receive equal scattering of light via the translucent material and may generate the three-dimensional graphic image based on the illumination on the translucent material. In another example, each layer of the printed layer 104 may be configured to receive different scattering of light based on deposition of the printed layer 104 on the first location 102A of the base 102 and may generate the three-dimensional graphic image based on the illumination on the translucent material of the printed layer 104. Examples of the translucent materials may include a plastic material or a glass material, which may allow the light to scatter on the printed layer 104.

In another embodiment, each layer (such as, the first layer 106 and the second layer 108) of the plurality of layers of the printed layer 104 comprises a material with different density. For example, the first layer 106 may include a first material having a first density in at least one of: an axial direction, a radial direction or a tangential direction. The second layer 108 may include a second material having a second density in at least one of: an axial direction, a radial direction or a tangential direction. Based on a directional orientation of the densities of the first layer and the second layer, there may be a modification in the generation of the three-dimensional image. In some instances, the second density may be different than the first density. For example, the second density may be higher than the first density. In such instances, the second layer 108 may generate the three-dimensional graphic image on the printed layer 104 in a higher resolution compared to the first layer 106. In other instances, the second density may be oriented in a direction that may be different from the first density. For example, the second density may be orientated in the axial direction and the first density may be oriented in the radial direction. In such instances, there may be a corresponding variation in the generation of the three-dimensional graphic image.

The printed layer 104 may be formed by a layer-by-layer printing process, which is sequentially formed on the base 102 of the vehicle wheel cover 100. For example, there may be various materials (such as, plastics, liquids, or powders) that may be blended and disposed layer-by-layer onto the base 102 to form the printed layer 104. Examples of such layer-by-layer printing process may include, but not limited to, an additive manufacturing process, a laminated object modeling process, and the like. In some instances, the printed layer 104 may also be formed from at least one of: a lenticular printing process, a holographic printing process, or a laser etching process.

The lenticular printing process is a printing technology that involves lenticular lenses to produce the printed layer 104 with a depth illusion, or with a perspective to change or move the printed layer 104 as they are viewed from different angles. For example, the printed layer 104 formed via the lenticular printing process may also correspond to a perspective of the movement of images of the spokes printed on the base 102, based on the depth illusion of images of the spokes of the printed layer 104. Examples of the lenticular printing process may include, but not limited to, a transforming print process, an animated printing process, or a stereoscopic effect printing process. The transforming printing process may require a relatively large change in angle of view to switch from one illusion to another illusion. The animated printing process may require a minimal change in angle of view to switch from one image to another. The stereoscopic effect printing process may allow each eye of the user to see a slightly different view on the illusion.

The holographic printing process may include a rendition of a hologram of the printed layer 104 on the base 102 (such as, the substantially flat surface), to produce the three-dimensional graphic image when viewed. In some instances, the printed layer 104 may be formed from a holographic print that may be different from a traditional hologram such that the print does not require any special lighting arrangements to form a 3-D effect. Thus, specific components (such as an eyewear, or a control stick) may not be required to view the printed layer 104. Instead, mere change in the angle of view of the user may rapidly modify the illusion of the printed layer 104, made via the holographic printing process.

The laser etching process is another method of forming the printed layer 104. In an embodiment, the laser etching process may involve lasers to etch and engrave to form the printed layer 104. For example, the laser etching process may include melting of materials, or ablation of materials to form the printed layer 104 onto the base 102 of the vehicle wheel cover 100. In such process, there may be a requirement for a selection of materials that may be suitable for the laser etching process. For example, the materials may include sensitive polymers or metal alloys. Based on the user requirements, the laser etching process may be used to form the printed layer 104.

The printed layer 104 may be formed from the plurality of layers of images (for example, the first layer 106 and the second layer 108), such that, each layer of the plurality of layers of the printed layer 104 may be formed on the base 102, with a second thickness in a second range from 1 mm to 5 mm. In an embodiment, the second thickness of the printed layer 104 may be different from the first thickness 102C of the base 102. In another embodiment, the second thickness of the printed layer 104 may be same as the first thickness 102C of the base 102.

In an embodiment, each layer (such as the first layer 106 and/or the second layer) of the printed layer 104 may be formed at a dimension of the second thickness. In an example, the first layer 106 of the plurality of layers may be located at a first depth 106A from other layers of the plurality of layers and the second layer 108 may be disposed at a second depth 108A from other layers of the plurality of layers. In an embodiment, the second depth 108A (such as, 3 mm) may be different from the first depth 106A (such as, 1 mm). In embodiment, the second layer 108 may be thicker than the first layer 106. In an embodiment, the first layer 106 and the second layer 108 may correspond to the second thickness of the printed layer 104. Based on the varied thickness, there may be an improvement in the illusion of the formed three-dimensional graphic image of the spokes of the wheels.

In another example, the first layer 106 of the plurality of layers may be located at the first depth 106A (such as, 1 mm) from other layers of the plurality of layers and the second layer 108 may be disposed at the second depth 108A (such as, 1 mm) from other layers of the plurality of layers. In an embodiment the second layer 108 may have the same thickness as the first layer 106, which may correspond to the second thickness. Based on same thickness of all layers of the printed layer 104, the vehicle wheel cover 100 may be formed at a minimal thickness, which may substantially reduce a weight of the vehicle wheel cover 100 and further, reduce the aerodynamic drag via the vehicle wheel cover 100.

In an embodiment, the printed layer 104 may form the three-dimensional graphic image based on the first depth 106A of the first layer 106 of the printed layer 104. For example, the vehicle wheel cover 100 with the printed layer 104 on the base 102, may form the three-dimensional graphic image based on the first depth 106A on the printed layer 104. In another embodiment, the printed layer 104 may form the three-dimensional graphic image based on the first depth 106A of the first layer 106 and the second depth 108A of the second layer 108 of the printed layer 104. For example, the vehicle wheel cover 100 with the printed layer 104 on the base 102, may form the three-dimensional graphic image based on the first depth 106A and the second depth 108A on the printed layer 104. In an alternate example, the printed layer 104 may be an inlay, or an etched surface (for example, via the laser etching process), which may be configured to generate the three-dimensional graphic image based on the illumination of the light.

The plurality of brake cooling holes 110 may be formed as a pattern (such as a circular pattern, a polygonal pattern, etc.) at the second location 102B of the base 102. In an embodiment, the plurality of brake cooling holes 110 are vent holes formed in the circular pattern at the second location 102B of the base 102. Each of the plurality of brake cooling holes 110 may be configured to allow airflow on brakes of the wheels and improve cooling of the brakes disposed adjacent to the vehicle wheel cover 100. Therefore, the plurality of brake cooling holes may improve a lifespan of the brakes that may be located adjacent to the vehicle wheel cover 100.

With reference to FIG. 1B, there is shown the vehicle wheel cover 100 that is coupled to a vehicle 112, in accordance with an embodiment of the disclosure.

The vehicle 112 may include a non-autonomous vehicle, a semi-autonomous vehicle, or a fully autonomous vehicle, for example, as defined by National Highway Traffic Safety Administration (NHTSA). In some situations, the vehicle 112 may also include a vehicle with autonomous drive capability that uses one or more distinct renewable or non-renewable power sources, such as, a fossil fuel-based vehicle, an electric propulsion-based vehicle, a hydrogen fuel-based vehicle, a solar-powered vehicle, and/or a vehicle powered by other forms of alternative energy sources. The vehicle 112 shown in FIG. 1B is merely an example of a four-wheeled vehicle. In another example, the vehicle 112 may also be a one-wheeler vehicle, a two-wheeler vehicle, or a three-wheeler vehicle. Examples of the three-wheeler vehicle may include, but are not limited to, an electric three-wheeler, an internal combustion engine (ICE)-based three-wheeler, or a hybrid three-wheeler. In yet another example, the vehicle 112 may also include a vehicle with more than four wheels, such as a lorry, truck, and the like.

In FIG. 1B, there is shown an illumination element 114 that may be configured to illuminate the vehicle wheel cover 100 and form a three-dimensional graphic image 116. In an embodiment, the illumination element 114 activates the printed layer 104 to output the three-dimensional graphic image 116 as an illusion of moving images (such as moving spokes) based on an angle of incidence 114A of light from the illumination element 114 and an angle of view of a viewer. The angle of view of the viewer is described further, for example, in FIG. 4.

In an embodiment, the illumination element 114 may include at least one of: a natural light source, an artificial light source, or a reflective element, which may be configured to activate the printed layer 104 to output the three-dimensional graphic image 116 as the illusion of moving images (such as moving spokes). The natural light source may include one of: sun, stars, moon, lightning, and the like. For example, if the vehicle 112 is operated in a daytime, the illusion of the three-dimensional graphic image 116 may be directly activated under the influence of the sun and the artificial light source or the reflective element may not be required to activate the illusion of the three-dimensional graphic image 116 of the printed layer 104.

In another example, if the vehicle 112 is operated in a night-time, the illusion of the three-dimensional graphic image 116 may be required to be manually activated either under the influence of the artificial light source or the reflective element. The artificial light source may include one of: an incandescent light, a fluorescent light, a vapor bulb, a light emitting diode (LED) bulb, and the like. In an embodiment, the artificial light source may be releasably coupled to a part of the vehicle wheel cover 100 and configured to manually activate the illusion of the three-dimensional graphic image 116 formed on the printed layer 104. In another embodiment, the artificial light source may be integrated with the vehicle wheel cover 100 and configured to manually activate the illusion of the three-dimensional graphic image 116 formed on the printed layer 104. In yet another embodiment, the artificial light source may be remotely coupled with the vehicle wheel cover 100 via the vehicle 112 and configured to manually activate the illusion of the three-dimensional graphic image 116 formed on the printed layer 104.

In certain instances, instead of the artificial light source, the reflective element may be used to manually activate the illusion of the three-dimensional graphic image 116 formed on the printed layer 104. The reflective element may include any shiny surface that is configured to reflect light towards the three-dimensional graphic image 116 that may be formed on the printed layer 104. In an example, the reflective element may include one of: a polished metal, or a mirror glass, which may be configured to reflect light towards the three-dimensional graphic image 116 that may be formed on the printed layer 104. The key advantage of having the reflective element is that there will be no energy spent by the vehicle 112 to activate the three-dimensional graphic image 116 of the printed layer 104. The reflective element may be configured to receive light illumination from other external sources (such as natural and/or artificial light sources in an environment of driving operation) and reflect such illumination towards the printed layer 104 of the vehicle wheel cover 100 to form the three-dimensional graphic image 116.

In certain instances, the output of the three-dimensional graphic image 116 may be controlled based on the angle of incidence 114A of the illumination of light from the illumination element 114 (such as, via at least one of: the natural light source, the artificial light source, or the reflective element) on the printed layer 104. In an example, the angle of incidence 114A may be controlled based on a location and an angle of the illumination element 114 (for example, the location and the angle of one of: the natural light source, the artificial light source, or the reflective element). Therefore, based on the angle of the illumination element 114 and subsequent angle of incidence 114A of the illumination of light, the three-dimensional graphic image 116 may be modified with a change in illusion for the viewer of the vehicle 112.

The three-dimensional graphic image 116 may include one or more graphic images based on the plurality of layers of the printed layer 104. In an embodiment, the three-dimensional graphic image 116 may include a central hub 116A and a plurality of spokes 116B that may radially extend from the central hub 116A. In an embodiment, the central hub 116A may be located at a midpoint of the base 102 and the plurality of spokes 116B may be spaced apart from each other and radially arranged exterior to the central hub 116A. In an example, the plurality of spokes 116B may be formed as images of spokes of the wheels. For example, each spoke is equally spaced from other spokes of the three-dimensional graphic image 116. In another embodiment, each spoke may be spaced at a pattern from other spokes of the three-dimensional graphic image 116. For example, a first spoke and a second spoke of the three-dimensional graphic image 116 may be spaced at a first space and a third spoke and a fourth spoke of the three-dimensional graphic image 116 may be spaced at a second space. The first space may be different from the second space. The first space and the second space may be repeated in a sequential manner between other spokes of the three-dimensional graphic image 116. In yet another embodiment, each spoke is spaced at different spacings from other spokes of the three-dimensional graphic image 116. For example, no two spokes in the three-dimensional graphic image 116 may have equal spacing with other two spokes of the three-dimensional graphic image 116.

In another embodiment, the three-dimensional graphic image 116 may include images other than spokes of the wheels. For example, the three-dimensional graphic image 116 may include a textual image, or a moving graphic image. The textual image or the moving graphic image may indicate a visual alert for users in an environment of vehicle wheel cover 100. The textual image or the moving graphic image may also improve styling of the vehicle wheel cover 100. Details of the textual image or the moving graphic image of the three-dimensional graphic image 116 may be described, for example, in FIG. 3.

In operation, the vehicle wheel cover 100 may include the printed layer 104 at the first location 102A of the base 102. The printed layer 104 may be formed from the plurality of layers of images that has the first layer 106 (such as the graphic image of the first spoke), which may be located at the first depth 106A from other layers (such as the graphic image of other spokes of the wheel) of the plurality of layers. Based on a change in depth between the first layer 106 (such as the graphic image of the first spoke) and other layers (such as the graphic image of other spokes of the wheel) of the plurality of layers, the vehicle wheel cover 100 may form the three-dimensional graphic image 116 (such as a holographic/lenticular printed image) based on the illumination of the vehicle wheel cover 100 from the illumination element 114 (such as via one of, the natural light source, the artificial light source, or the reflective element) and based on the movement of the vehicle wheel cover 100 and the vehicle 112. As the three-dimensional graphic image forms a styling of the wheel of the vehicle 112, there may not be a requirement for a substantially concave structure (which may cause an aerodynamic drag) of the wheel covers for styling the vehicle. Therefore, the vehicle wheel cover 100 substantially reduces the aerodynamic drag of the vehicle 112.

The vehicle wheel cover 100 may further include the plurality of brake cooling holes 110 that may be formed as the pattern at the second location 102B on the second location 102B of the base 102. In an embodiment, the pattern may include the circular pattern, the polygonal pattern, and the like, and may be formed at the second location 102B of the base 102. For example, the plurality of brake cooling holes 110 are vent holes formed in the circular pattern at the second location 102B of the base 102. The vent holes may be configured to allow airflow on brakes of the wheels and improve cooling of the brakes disposed adjacent to the vehicle wheel cover 100. Therefore, the plurality of brake cooling holes may improve the lifespan of the brakes that may be disposed adjacent to the vehicle wheel cover 100.

Figure 2:
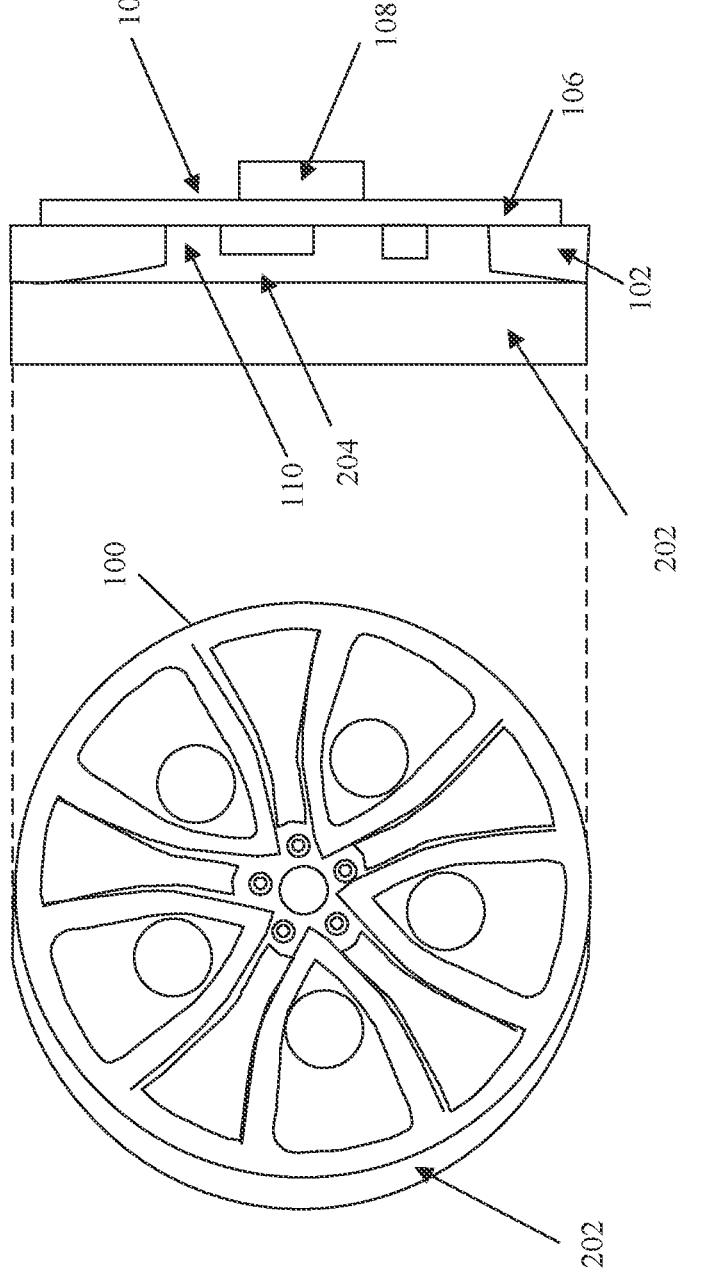
FIG. 2 is a perspective view that illustrates a first exemplary scenario of the vehicle wheel cover of FIG. 1A, in accordance with an embodiment of the disclosure.
Figure 2:

FIG. 2 is a perspective view that illustrates a first exemplary scenario of the vehicle wheel cover of FIG. 1A, in accordance with an embodiment of the disclosure. FIG. 2 is explained in conjunction with elements from FIGS. 1A-1B. With reference to FIG. 2, there is shown the vehicle wheel cover 100 that may be coupled to a wheel 200. The wheel 200 may include a wheel rim 202 and an annular cooling bed 204 between the wheel rim 202 and the wheel 200.

The wheel 200 may be formed as a circular component that is intended to rotate on an axle bearing (not shown) of the vehicle 112 (shown in FIG. 1B). The wheel 200 may be disposed in conjunction with axles, to allow transportation of cargo and/or users from one location to another location, via the vehicle 112. The wheel 200 may include the wheel rim 202 and other components, which are omitted from the disclosure for the sake of brevity.

The wheel rim 202 may be a metallic component of the wheel 200 that may be configured to hold a tire and/or an inner tube of the vehicle 112. The inner tube is configured to be disposed between the wheel rim 202 and the tire (not shown). In some instances, the wheel rim 202 may not be aesthetically styled in the vehicle 112. Hence, the vehicle wheel cover 100 is disposed on the wheel rim 202 to conceal the wheel rim 202 and improve aesthetic styling of the vehicle 112. In another instance, if the wheel rim 202 is directly exposed to an external environment of the driving conditions of the vehicle 112, a lifespan of the wheel rim 202 may be reduced. In such instances, the vehicle wheel cover 100 may shield the wheel rim 202 from the external environment and improve lifespan of the wheel rim 202. In yet another instance, if the wheel rim 202 is directly exposed during operation, it may contribute to aerodynamic drag of the vehicle 112. In such instances, the vehicle wheel cover 100 shields the wheel rim 202 and forms the substantially aerodynamic structure to minimize the aerodynamic drag of the vehicle 112.

In an embodiment, the printed layer 104 may be sized to fit on the base 102 and within the wheel rim 202 of the vehicle 112. In an example, the printed layer 104 is the image of spokes of the wheel 200 that may be sized to fit on the base 102 and within the wheel rim 202, such that, when illuminated, the printed layer 104 may form a realistic illusion of the three-dimensional graphic image 116 (shown in FIG. 1B).

The annular cooling bed 204 may be formed between the wheel rim 202 and the vehicle wheel cover 100. In an embodiment, a portion between the base 102 and the wheel rim 202 forms the annular cooling bed 204. The annular cooling bed 204 may form a chamber to cool components of the wheel 200 based on the air flow via the brake cooling holes 110 (shown in FIG. 1A).

In operation, the base 102 of the vehicle wheel cover 100 may be coupled to the wheel rim 202 of the vehicle 112. During operation of the vehicle 112, the annular cooling bed 204 may be configured to receive a cooling fluid (such as the air flow) via the brake cooling holes 110. In an example, the annular cooling bed 204 may have a minimally convex surface at one portion, such that, when the cooling fluid is allowed in the annular cooling bed 204 via the brake cooling holes 110, a movement of a jet of cooling fluid is along the minimally convex surface (i.e., the Coanda effect), and may further improve cooling of components of the vehicle 112.

Figure 3:
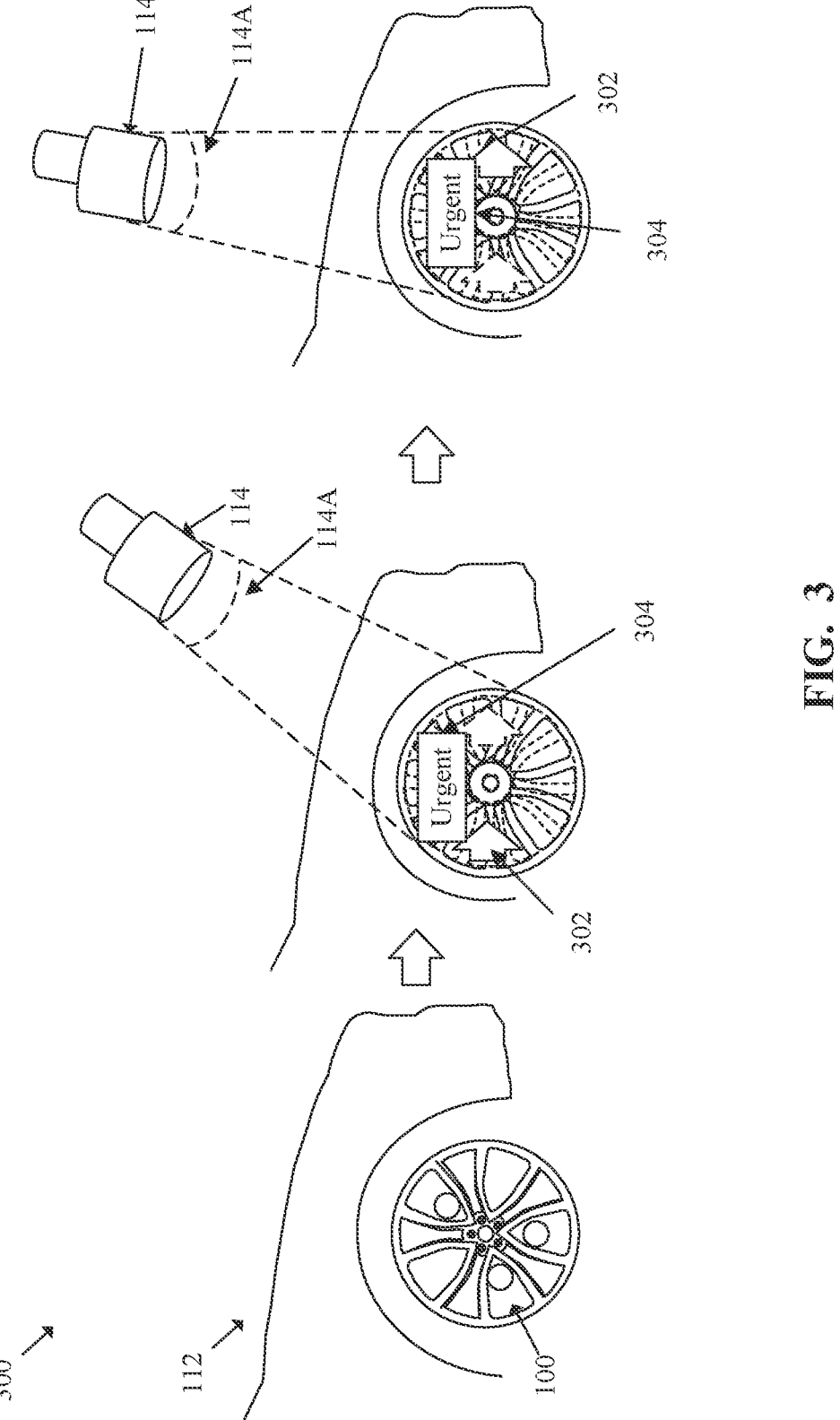
FIG. 3 is a perspective view that illustrates a second exemplary scenario of the vehicle wheel cover of FIG. 1A, in accordance with an embodiment of the disclosure.

FIG. 3 is a perspective view that illustrates a second exemplary scenario of the vehicle wheel cover of FIG. 1A, in accordance with an embodiment of the disclosure. FIG. 3 is explained in conjunction with elements from FIGS. 1A-1B and FIG. 2. With reference to FIG. 3, there is shown an exemplary scenario 300 of the vehicle wheel cover 100. When illuminated via the illumination element 114 and/or based on the movement of the vehicle 112, the printed layer 104 may form the three-dimensional graphic image 116 that may include one or more graphic images based on the plurality of layers of the printed layer 104. For example, the printed layer 104 of the vehicle wheel cover 100 may form one of: a moving graphic image 302, or a textual image 304.

The moving graphic image 302 may include at least two different images located at different portions and at different depths as the printed layer 104. For example, the moving graphic image 302 may include a first image and a second image. As shown in FIG. 3, for example, the first image may indicate an arrow that may be disposed at a first portion. The second image may indicate an arrow that may be disposed at a second portion. The second portion may be different from the first portion. In such instances, based on the angle of incidence 114A of the illumination element 114, the printed layer 104 may form the three-dimensional graphic image 116 that indicates a presence of the first arrow at the first portion and an absence of the second arrow at the second portion of the printed layer 104.

When the angle of incidence 114A of the illumination element 114 is changed, the three-dimensional graphic image 116 may be modified that may indicate an absence of the first arrow at the first portion and a presence of the second arrow at the second portion of the printed layer 104, as shown in FIG. 3. Such sequential operation may form an illusion of the moving graphic image 302. The moving graphic image 302 shown in FIG. 3 is merely an example. The printed layer 104 may include any other moving graphic images, such as, a moving graphic of a running horse, a moving graphic of a telephone number, and the like. In another embodiment, the three-dimensional graphic image 116 may also be formed as at least one of: the moving graphic image 302, a static graphic image, the textual image 304, or a combination thereof. The static graphic image may include a graphic image that may look substantially like the moving graphic image 302; but disposed at a single location without any change in movement of the illusion irrespective of the angle of incidence 114A form the illumination element 114.

The textual image 304 may include at least one textual image on the printed layer 104 of the vehicle wheel cover 100. The textual image 304 may relate to any indication and/or alert for viewers of the vehicle 112. For example, in case the vehicle 112 is an ambulance vehicle, it may display the textual image 304 as "Emergency! Please leave the way!" or "Urgent" (as shown for example in FIG. 3). In another example, in case the vehicle 112 is an advertising billboard vehicle, it may display the textual image 304 as "Sale! Sale! Expires this week!". In an embodiment, the textual image 304 may be modified based on user requirements of the vehicle 112.

Figure 4:
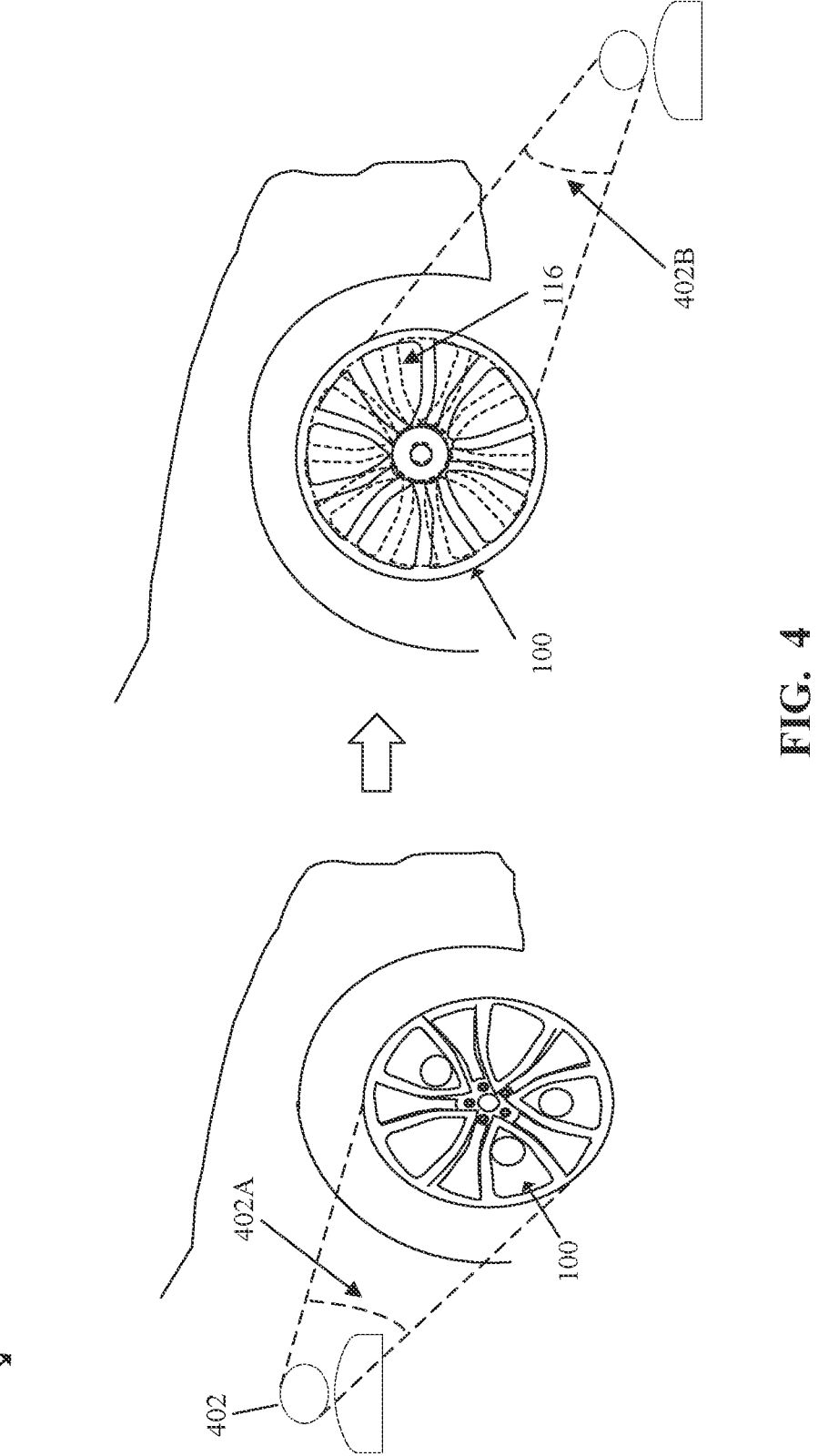
FIG. 4 is a perspective view that illustrates a third exemplary scenario of the vehicle wheel cover of FIG. 1A, in accordance with an embodiment of the disclosure.

FIG. 4 is a perspective view that illustrates a third exemplary scenario of the vehicle wheel cover of FIG. 1A, in accordance with an embodiment of the disclosure. FIG. 4 is explained in conjunction with elements from FIGS. 1A-1B, FIG. 2, and FIG. 3. With reference to FIG. 4, there is shown an exemplary scenario 400 of the vehicle wheel cover 100. In certain instances, based on a viewer 402 of the vehicle 112, the shape and the structure of the three-dimensional graphic image 116 may be modified.

In an embodiment, based on a viewing angle of the viewer 402, the shape and the structure of the three-dimensional graphic image 116 may be modified. For example, based on a first viewing angle 402A of the viewer 402, the three-dimensional graphic image 116 may be formed as a first shape and a first structure. In another example, based on a second viewing angle 402B of the viewer 402, the three-dimensional graphic image 116 may be formed as a second shape and a second structure. Therefore, in addition to the angle of incidence 114A (shown in FIGS. 1B and 3) of the illumination element 114, the viewing angle of the viewer 402 may also significantly contribute to a change in the shape and the structure of the three-dimensional graphic image 116. In another embodiment, a viewing capability (such as an eyesight of the user, for example, the three-dimensional graphic image viewed by a viewer with a normal vision, may be different, from the three-dimensional graphic image viewed by a viewer with a distant vision) of the viewer 402 may also significantly contribute to the change in the shape and the structure of the three-dimensional graphic image 116. In yet another embodiment, an intensity of the illumination element 114 may be an additional factor that may contribute to the change in the shape and the structure of the three-dimensional graphic image 116. In yet another embodiment, a lifespan (such as a date of formation of the printed layer 104 or a date of purchase of the vehicle 112) of the printed layer 104 may be an additional factor that may contribute to the change in the shape and the structure of the three-dimensional graphic image 116.

Figure 5:
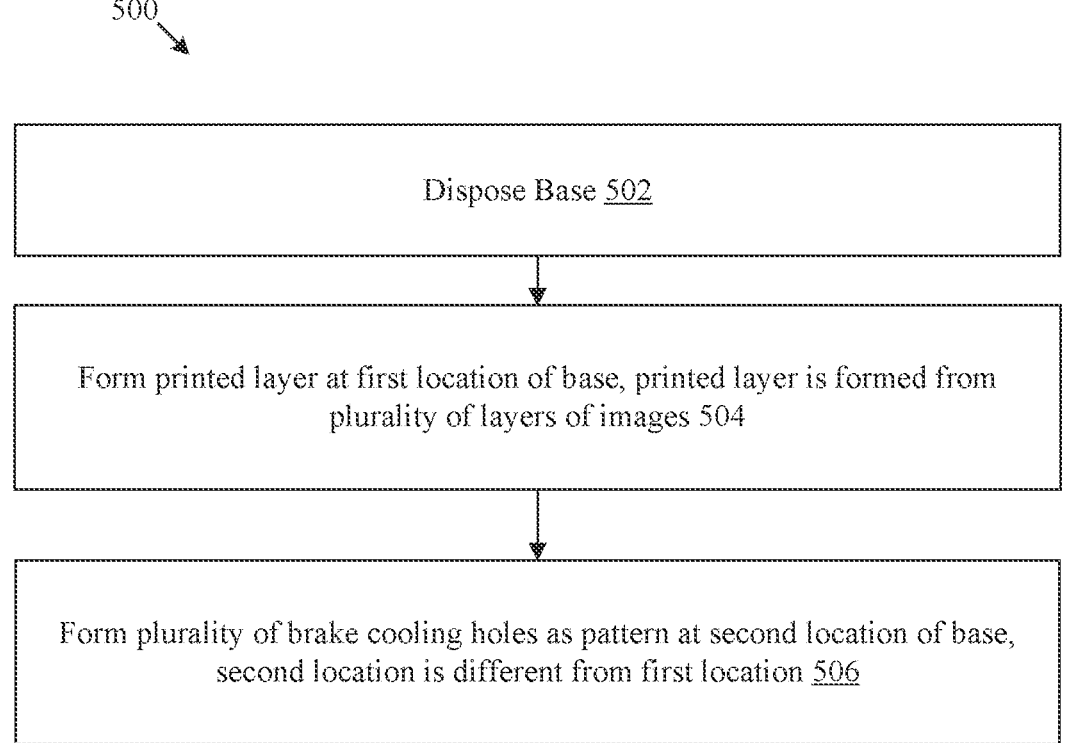
FIG. 5 is a flowchart that illustrates exemplary operations to form the vehicle wheel cover of FIG. 1A, in accordance with an embodiment of the disclosure.

FIG. 5 is a flowchart that illustrates exemplary operations to form the vehicle wheel cover of FIG. 1A, in accordance with an embodiment of the disclosure. FIG. 5 is explained in conjunction with elements from FIGS. 1A-1B, FIG. 2, FIG. 3, and FIG. 4. With reference to FIG. 5, there is shown a flowchart 500. The operations from 502 to 508 may be implemented, for example, by a user or a manufacturer of the vehicle 112. The operations of the flowchart 500 may start at 502.

At 502, the base 102 may be disposed. In an embodiment, the user or the manufacturer of the vehicle 112 may form or dispose the base 102 as described further, for example, FIGS. 1A-1B.

At 504, the printed layer 104 may be formed at the first location 102A of the base 102. The printed layer 104 may be formed from the plurality of layers of images. In an embodiment, the user or the manufacturer may form the printed layer 104 as described, for example, in FIGS. 1A-1B.

At 506, the plurality of brake cooling holes may be formed as the pattern (such as the circular pattern) at the second location 102B of base 102. The second location 102B may be different from first location 102A. In an embodiment, the user or the manufacturer may form the plurality of brake cooling holes 110 as described, for example, in FIGS. 1A-1B.

In certain instances, the second layer 108 of the plurality of layers may be formed or disposed at the second depth 108A from the other layers of the plurality of layers, where the second depth 108A may be different from the first depth 106A, as described, for example, in FIGS. 1A-1B. In an embodiment, the user or the manufacturer may form the second layer 108 as described, for example, in FIGS. 1A-1B.

The flow chart shown in FIG. 5 is illustrated as discrete operations, such as from 502 to 506, which relates to the formation of the vehicle wheel cover 100 for the vehicle 112. However, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe, and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A vehicle wheel cover, comprising:
a base;
a printed layer formed at a first location of the base, the printed layer is formed from a plurality of layers of images, wherein
at least a first layer of the plurality of layers is located at a first depth from other layers of the plurality of layers; and

a plurality of brake cooling holes formed as a pattern at a second location of the base, the second location is different from the first location, wherein, based on a movement and an illumination of the vehicle wheel cover, the printed layer forms a three-dimensional graphic image, the base is coupled to a wheel rim of a vehicle, and a portion between the base and the wheel rim forms an annular cooling bed, the annular cooling bed is configured to receive a cooling fluid via the plurality of brake cooling holes.

2. The vehicle wheel cover according to claim 1, wherein at least a second layer of the plurality of layers is disposed at a second depth from the other layers of the plurality of layers, the second depth is different from the first depth, and the three-dimensional graphic image is formed based on the first depth and the second depth of the printed layer.

3. The vehicle wheel cover according to claim 1, wherein at least one layer of the plurality of layers of the printed layer is formed from a translucent material.

4. The vehicle wheel cover according to claim 1, wherein each layer of the plurality of layers of the printed layer comprises a material with different density.

5. The vehicle wheel cover according to claim 1, wherein the printed layer is formed from at least one of: a lenticular printing process, a holographic printing process, or a laser etching process.

6. The vehicle wheel cover according to claim 1, wherein the base is coupled to a wheel rim of a vehicle; and a portion between the base and the wheel rim forms an annular cooling bed, the annular cooling bed is configured to receive a cooling fluid via the brake cooling holes.

7. The vehicle wheel cover according to claim 1, wherein the printed layer is sized to fit on the base and within the wheel rim of the vehicle.

8. The vehicle wheel cover according to claim 1, wherein the base has a first thickness in a first range from 1 mm to 3 mm; and each layer of the plurality of layers of the printed layer on the base has a second thickness in a second range from 1 mm to 5 mm.

9. The vehicle wheel cover according to claim 1, wherein a contour of the base is configured to control an angle of incidence of the illumination of light on the printed layer and corresponding formation of the three-dimensional graphic image.

10. The vehicle wheel cover according to claim 1, wherein the three-dimensional graphic image comprises a central hub and a plurality of spokes radially extending from the central hub, and the central hub is located at a midpoint of the base.

11. The vehicle wheel cover according to claim 1, wherein the three-dimensional graphic image is formed as at least one of: a moving graphic image, a static graphic image, or a textual image.

12. The vehicle wheel cover according to claim 1, wherein a shape and a structure of the three-dimensional graphic image is modified based on a viewing angle of a viewer.

13. The vehicle wheel cover according to claim 1, wherein an output of the three-dimensional graphic image is controlled based on an angle of incidence of the illumination of light on the printed layer.

14. The vehicle wheel cover according to claim 1, further comprising: an illumination element configured to illuminate the vehicle wheel cover and form the three-dimensional graphic image.

15. The vehicle wheel cover according to claim 14, wherein the illumination element comprises at least one of: a natural light source, an artificial light source, or a reflective element.

16. The vehicle wheel cover according to claim 1, wherein the three-dimensional graphic image may include one or more graphic images based on the plurality of layers of the printed layer.

17. A vehicle wheel cover, comprising:

a base;

a printed layer disposed at a first location of the base, the printed layer is formed from a plurality of layers of images, wherein at least a first layer of the plurality of layers is located at a first depth from other layers of the plurality of layers; and a plurality of brake cooling holes formed as a pattern and disposed at a second location of the base, the second location is different from the first location, wherein the base is coupled to a wheel rim of a vehicle, and a portion between the base and the wheel rim forms an annular cooling bed, the annular cooling bed is configured to receive a cooling fluid via the plurality of brake cooling holes.

18. The vehicle wheel cover according to claim 17, wherein at least a second layer of the plurality of layers is disposed at a second depth from the other layers of the plurality of layers, the second depth is different from the first depth, and based on the first depth and the second depth of the printed layer, the printed layer forms a three-dimensional graphic image.

19. A method, comprising:

disposing a base;

forming a printed layer at a first location of the base, the printed layer is formed from a plurality of layers of images, wherein at least a first layer of the plurality of layers is located at a first depth from other layers of the plurality of layers; and forming a plurality of brake cooling holes as a pattern at a second location of the base, the second location is different from the first location, wherein the base is coupled to a wheel rim of a vehicle, and a portion between the base and the wheel rim forms an annular cooling bed, the annular cooling bed receives a cooling fluid via the plurality of brake cooling holes.

20. The method according to claim 19, further comprising, disposing at least a second layer of the plurality of layers at a second depth from the other layers of the plurality of layers, wherein, the first layer has a first material with a first density, the second layer has a second material with a second density, the second density is different from the first density.

* * * * *